United States Patent [19]

LeRoux et al.

[11] Patent Number: 4,692,083
[45] Date of Patent: Sep. 8, 1987

[54] METHOD AND APPARATUS FOR AIR JET ASSISTED FILM UNLOADING FROM X-RAY CASSETTES

[75] Inventors: Donald F. LeRoux, Elkton, Md.; Quayton R. Stottlemyer, Wilmington, Del.

[73] Assignee: E. I. Du Pont de Nemours and Company, Wilmington, Del.

[21] Appl. No.: 643,186

[22] Filed: Aug. 22, 1984

[51] Int. Cl.⁴ ............................................. G03B 42/04
[52] U.S. Cl. ................................... 414/411; 271/97; 378/182; 414/786
[58] Field of Search ............... 414/116, 403, 416, 417, 414/411, 786; 53/266 C; 271/97, 98, 105, 195; 378/182, 185, 186, 187, 188; 15/300 R, 304, 316 R, 405

[56] References Cited

U.S. PATENT DOCUMENTS

| | | | |
|---|---|---|---|
| 1,865,510 | 7/1932 | Dorsey | 15/405 |
| 2,979,329 | 4/1961 | Cunningham | 271/97 X |
| 3,159,164 | 12/1964 | McBrady | 15/304 |
| 3,278,971 | 10/1966 | Drew | 15/304 |
| 3,684,276 | 8/1972 | Bridgeman | 271/20 |
| 3,715,087 | 2/1973 | Schmidt | 242/67.3 R |
| 3,857,040 | 12/1974 | Zwettler et al. | 378/186 |
| 3,884,818 | 5/1975 | Tomita et al. | 250/480 |
| 3,907,280 | 9/1975 | Bendall et al. | 271/174 |
| 4,163,499 | 8/1979 | Schmidt | 414/411 |
| 4,201,919 | 5/1980 | Schmidt | 53/266 C |
| 4,369,960 | 1/1983 | Brisebarre | 271/5 |
| 4,383,330 | 5/1983 | DeFelice et al. | 378/187 |
| 4,514,958 | 5/1985 | Hoorn | 414/403 X |

FOREIGN PATENT DOCUMENTS 2414073 9/1975 Fed. Rep. of Germany ...... 378/187
0022226 2/1983 Japan ...................................... 271/98

OTHER PUBLICATIONS

William J. Woznicki, Xerox Disclosure Journal, vol. 6, No. 6, Nov./Dec. 1981.

Primary Examiner—Robert J. Spar
Assistant Examiner—Stuart J. Millman

[57] ABSTRACT

A release mechanism for a side opening x-ray cassette uses an air jet to release the x-ray film from sticking and facilitating its removal from the cassette.

12 Claims, 5 Drawing Figures

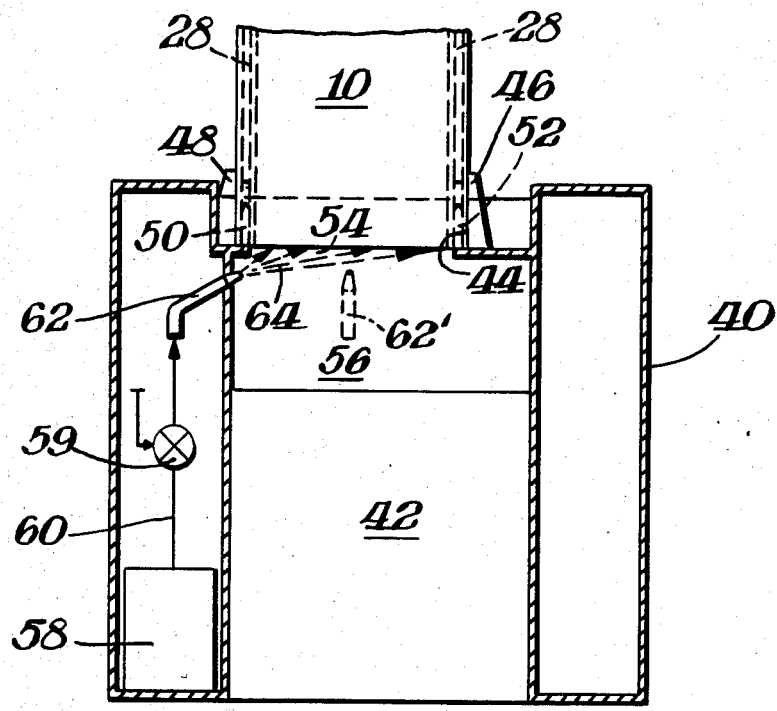

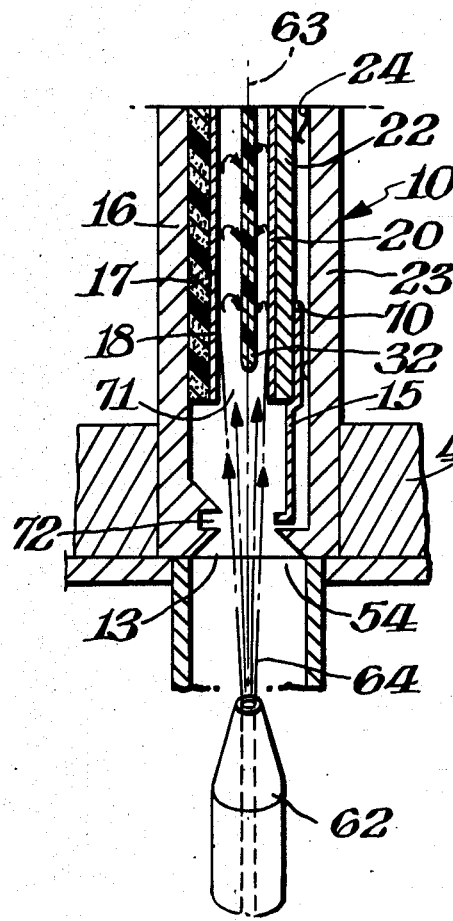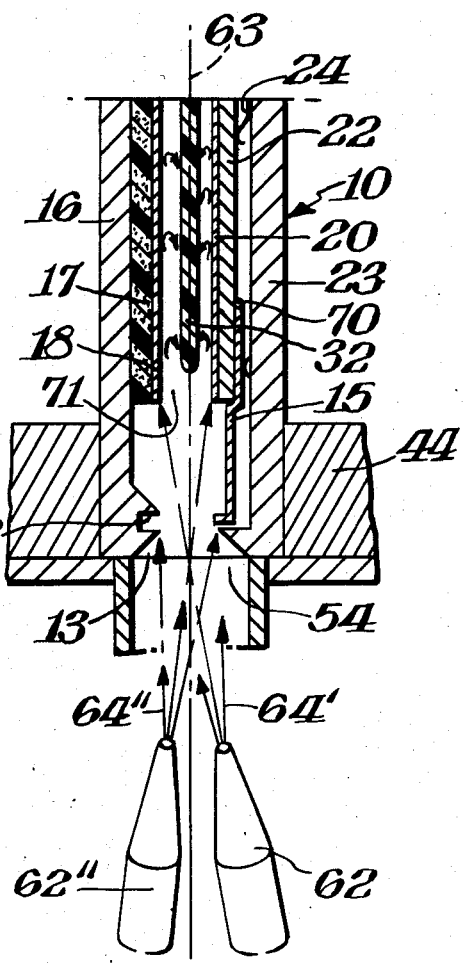

METHOD AND APPARATUS FOR AIR JET ASSISTED FILM UNLOADING FROM X-RAY CASSETTES

BACKGROUND OF THE INVENTION

This invention relates to a method and apparatus for unloading x-ray film cassettes and more particularly to a method and apparatus using an air stream to assist in unloading x-ray film from cassettes that have a load/unload slot in one edge.

In the development of x-ray film handling systems, equipment has been provided which allows the automatic loading (and unloading) of x-ray film into a cassette under daylight conditions. Such equipment frees the operator from the need to load and unload the film to and from a cassette in a darkroom. Exemplary of such automatic system is that disclosed in U.S. Reissue No. 30,792 (Schmidt) assigned to the assignee of the instant invention. This reissue patent describes an x-ray film package for use with a daylight side loading cassette of the type disclosed in U.S. Pat. Nos. 3,784,835 and 3,870,889 (both issued to Schmidt and both assigned to the assignee of the present application). U.S. Pat. No. 3,715,087 (Schmidt) describes a device used for unloading cassettes of the type disclosed in the last mentioned patents under daylight conditions.

In operation, the x-ray film sheet is automatically side loaded through a side slot into the cassette which is operative to hold the film between two opposed substantially parallel x-ray intensifying screens during the period of patient exposure. Following exposure, the screens are separated thereby unclamping the film sheet. The cassette is unloaded under the influence of gravity by allowing the film sheet to slip out of the cassette through the side slot. This is accomplished by a device as disclosed in the last mentioned patent which is adapted to release one of the two cassette plates holding the intensifying screens to thereby release the holding pressure from the film sheet and allow it to drop under the influence of gravity into a lighttight container.

For a variety of reasons it is important that the time required for the film to drop from the cassette be maintained to within a reasonable maximum on the order of approximately seven seconds. It is believed to be most advantageous if the film drop time occupy on the order of two to three seconds. However, it has been found that in cassettes embodying the teachings of the above referenced patents, the x-ray film often develops a tendency to adhere to one or the other of the intensifying screens even after the holding pressure is relieved therefrom. Attempts have been made to overcome this problem through the use of cautilevered conical actuators disposed along the cassette edges which are actuated by an actuating cam assembly and pivot inwardly of the cassette to thereby edgewise engage the film sheet and buckle the same to create a gap between the sheet and the screen. Air leakage into the gap tends to equalize the pressure forces on both sides of the sheet to permit it to respond to the influence of gravity and drop from the cassette.

U.S. Pat. No. 4,383,330 (DeFelice, et al.), assigned to the assignee of the present invention, discloses an improvement in the conical bucklers used in the prior art. However, the employment of bucklers to release the film requires cassettes especially designed to accommodate them. It is believed to be advantageous to provide an apparatus and a method which can accept an x-ray cassette of the type disclosed in U.S. Pat. Nos. 3,784,835 and 3,870,889, or other similar cassettes and which do not require special modifications for the quick release of the film therefrom.

SUMMARY OF THE INVENTION

An x-ray cassette unloading apparatus, generally free of the disadvantages of the prior art unloading apparatuses for unloading cassettes having adjacent plates contacting the x-ray film sheet and a side exit slot, has a housing defining a film sheet entrance slot and guide means adapted to position the cassette slot in alignment therewith. The apparatus includes means to separate the plates, and means to direct a fluid stream through the entrance and exit slots of sufficient momentum to loosen the film sheet from contact with a cassette plate, thereby permitting the film sheet to slide freely from the cassette into the entrance slot.

In a preferred embodiment, the fluid stream is a gas and preferably a stream of air. Air jets located on either side of the film path defined in said apparatus may be employed or a single jet may be disposed in a plane defined by the film sheet outside of the slide path of the film sheet.

The instant invention further relates to a method of unloading a film sheet from an x-ray cassette, the cassette having adjacent plates contacting the film sheet and defining a film sheet side exit slot, comprising the steps of separating the cassette plates and directing a fluid stream through the exit slot having sufficient momentum to loosen a film sheet from contact with a cassette plate, thereby permitting the film sheet to slide freely from the cassette. Using such method any x-ray cassette of the described side opening type may be unloaded quickly and without having to specially modify the cassette.

BRIEF DESCRIPTION OF THE DRAWINGS

The invention may be more fully understood from the following detailed description thereof taken in connection with accompanying drawings which form a part of this application and in which:

FIG. 3 is a schematic front elevational representation of the cassette unloading apparatus of FIG. 2 showing the position of an air nozzle employed to direct a fluid stream into the exit slot of a cassette inserted therein for unloading;

FIG. 4 is an enlarged view of a schematic presentation of an air nozzle blowing air into a cassette in accordance with the embodiment of FIG. 3; and FIG. 5 is a schematic representation of another embodiment of the invention in which two air nozzles are positioned on either side of a plane defined by a film held within a cassette.

DETAILED DESCRIPTION OF THE INVENTION

Figures 1, 2:
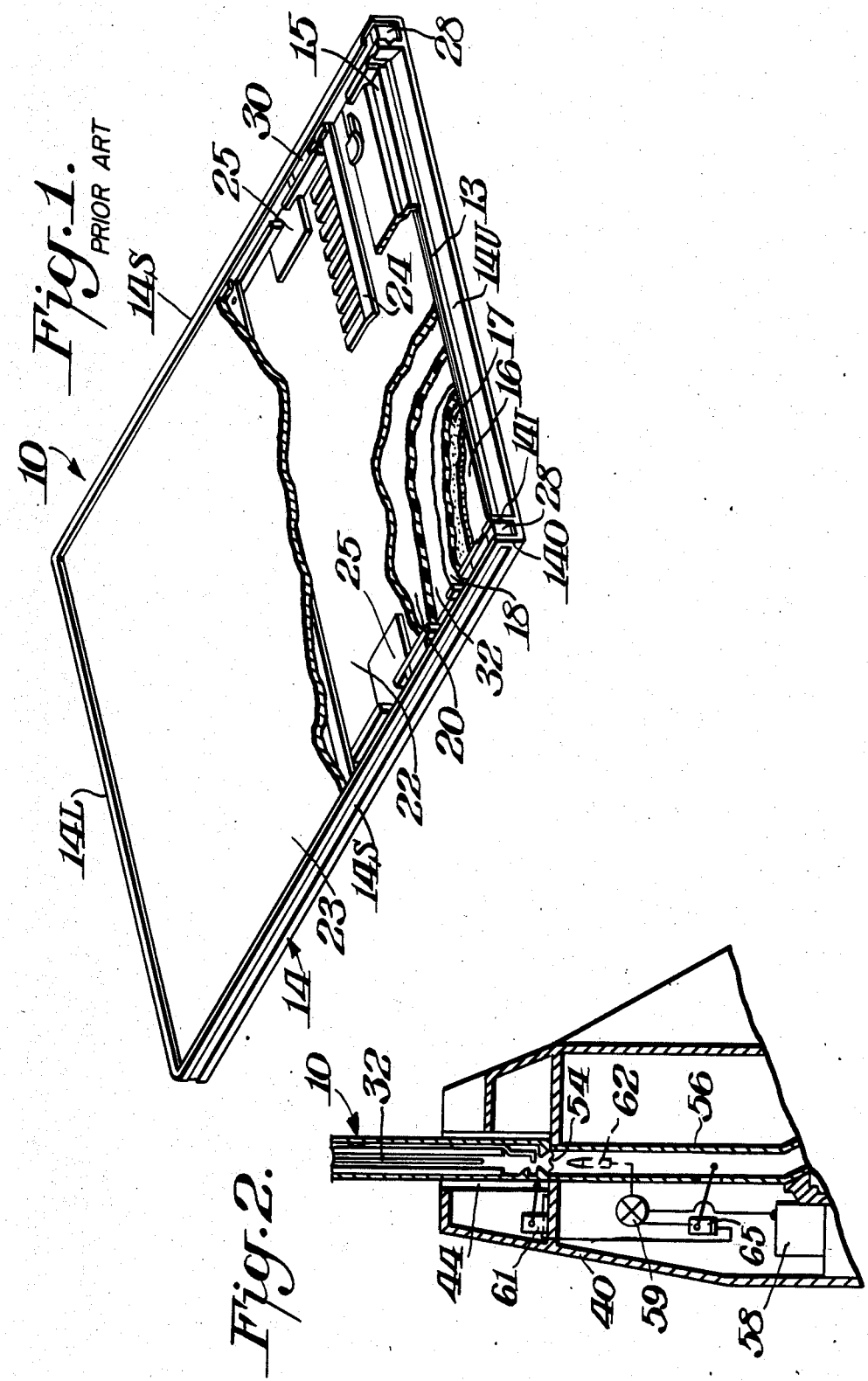
FIG. 1 is a perspective view showing the structure of an x-ray cassette typical of the side opening type that can be used with the present invention.
FIG. 2 is a fragmentary cross sectional side elevation view of a conventional cassette unloading apparatus modified in accordance with this invention.

Throughout the following detailed description similar reference numerals refer to similar elements in all figures of the drawings. With reference to FIG. 1, there is shown a perspective view of an x-ray cassette generally indicated by the reference character 10. The cassette 10 is formed of a rectangular frame 14 having opposed sidewalls 14S and upper and lower walls 14U and 14L, respectively. The upper frame wall 14U includes a slot 13 through which a film sheet may be inserted or retrieved from the cassette. A light gate 15 covers the slot when the cassette is closed. On the frame 14 is mounted an opaque x-ray transparent front or window plate 16. The plate 16 is fixedly mounted on the rectangular frame 14. The window plate 16 is fabricated of magnesium sheet although any suitable material meeting the above qualifications, such as aluminum, may be utilized. Disposed above the window plate 16 is a foam pad 17 and an x-ray intensifying screen 18. A second x-ray intensifying screen 20 is mounted to a backing plate 22 which is movably disposed within the frame 14. A rear plate 23 also mounted on the frame 14 completes the cassette 10. The plates 22 and 23 may be fabricated of aluminum or any other suitable material.

The sidewalls 14S of the frame 14 assume a channel cross-section having an inner and outer rail 14I and 14O, respectively. An appropriate number of biasing elements 24 are pivotally mounted on the inner rail 14I of the channel sidewalls 14S and extend transversely across the width of the frame 14. The biasing elements act to support the backing plate 22 and bias it toward the window plate 16. Reinforcing tabs 25 may be provided in larger size cassettes to reinforce the backing plate 22.

A cam rail assembly 28 is slidably received within each of the channels. Camming surfaces 30 on the cam rail 28 engage and actuate the biasing elements 24 to alternately release or urge the movable backing plate 22 against the window plate 16.

With a cam rail 28 in the first position, the biasing force imposed by the biasing elements 24 on the back plate is released defining a space 70 (FIG. 4) between the backing and the window plates sufficient to allow an x-ray film sheet 32 introduced through the slot 13 to be received between the two intensifying screens. With the cam rail 28 in a second position, the biasing elements 24 urge backing plate 22 toward the window plate 16 to provide intimate contact between the two intensifying screens 18 and 20 and the film sheet 32 sandwiched therebetween.

In order to unload a film sheet from the cassette a film unloading apparatus of the type shown in FIGS. 2 and 3 is disclosed. One such apparatus is disclosed in detail in U.S. Pat. No. 3,715,087 the contents of which are incorporated herein by reference. Briefly, such apparatus comprises an enclosure 40 containing a lighttight film receptor section 42 in which film sheets released from the cassette are temporarily stored. On the upper part of enclosure 40 there is a cassette receiving compartment 44 into which a cassette 10 to be unloaded is placed with its side slot 13 down. Two side guides 46 and 48 are used to hold a cassette in lighttight relationship with the film unloading apparatus during the unloading process. Two pins, 50 and 52, are positioned within the cassette receiving compartment adjacent to the cassette guides. An entrance slot 54 is located in the cassette receiving compartment. When a cassette is placed in the receiving compartment, the side guides 46 and 48 hold it in alignment with the two pins 50 and 52; the cassette film exit slot 13 is also aligned with unloader entrance slot 54. A film guide 56 connects receptor 42 to the entrance slot 54.

Positioned within enclosure 40 of the unloading apparatus there is in accordance with this invention an air compressor 58. Air from the air compressor is directed through a piping system 60 which preferably includes a reservoir (not shown) and solenoid actuated valve 59 to an air nozzle 62 positioned in the plane 63 defined by the film 32 but outside of film guide 56 so as not to interfere with the film path as the film passes from the cassette to the film guide 56. The nozzle 62 is aligned to direct an air stream 64 through the entrance slot 54 and the exit slot 13 of the cassette. A normally open microswitch 61 senses the cassette being in position and closes thereby energizing and opening the solenoid valve 59 to cause the nozzle to emit a burst of air. As the film 32 drops from the cassette, it is detected by a normally closed microswitch 65, thereby opening the microswitch which is connected in series with the microswitch 61 and a power supply (not shown) and closing the valve 59. The power supply for the valve is not shown for clarity. Pressures typically about 10 psi are used. Air blown from the nozzle 62 is directed through the film sheet entrance slot 54 to both sides of film sheet 32 held within the cassette 10. The air flow depicted by the arrows 64 enters the cassette through the exit slot 13 and impinges on the film sheet 32. The air blown onto the film 32 loosens the film from contact with the intensifying screens 18 and 20 and the film can drop freely through exit slot 13 and entrance slot 54 to the film receiving section 42 of the film unloading apparatus 40. If desired a portion of the edges of the intensifying screen adjacent to the film edge may be removed to facilitate this film release, but is generally not necessary.

Alternatively, the valve 59 may be omitted and the microswitch used to control directly the compressor 58 to supply air to the nozzle 62 each time the microswitch 61 is closed. Also optical switches could be used instead of microswitches.

In an alternative embodiment of the invention, seen in FIG. 4 and in phantom in FIG. 3 a pair of air nozzles 62' and 62" may be placed symmetrically on either side of the film plane 63 defined by the film sheet 32 held within the cassette 10. The two nozzles are angled so as to direct two air streams 64' and 64" through the entrance slot 54 and cassette exit 13 onto the film 32 held within the cassette. The angled air stream provide air to both sides of the film in the cassette. It is also possible to employ one jet stream from outside the film plane having sufficient momentum so that upon entry into the cassette through slot 54, the slot and internal walls of the cassette form a secondary nozzle redirecting the stream within the cassette on both sides of the film. It is important that the air be directed onto both sides of the film with respect to the film sheet plane 63 so that it will not preferentially force the film sheet against one or the other of the intensifying screens in the cassette. The air nozzles must of course be outside the falling film path.

It is also important that the amount, type and velocity of the air stream be limited so that its momentum is insufficient to overcome the force of gravity pulling the film sheet out of the cassette and into the receptor 42, while still being high enough to break the contact between the film sheet and the intensifying screen.

In operation a film cassette of the type disclosed is inserted into the cassette receiving opening 44 of the unloader apparatus 40. Pins 50 and 52 engage the operate cam assemblies 28 releasing the biasing elements and urging the movable backing plate 22 away from the window plate 16. Simultaneously, the light gate plate 15 is urged away from light gate receptacle 72 providing access to the interior of the cassette. The backward movement of backing plate 22 creates a space 70 within the cassette and removes the pressure from the film sheet 32. Simultaneously as the microswitch 61 senses the cassette in position, the valve 59 is opened and an air stream 64 is directed into the cassette exit slot 13 penetrating into space 70. The air stream peels off the film sheet 32, breaking its contact with one or the other of intensifying screens 18 and 20 mounted on plates 16 and 22 respectively. The film sheet is then quickly released and falls through gravity into receiving section 42.

With this invention various types of side opening cassettes may be used without modifications. In each case the time required to remove a film is greatly reduced.

Those skilled in the art having the benefits of the teachings of the instant invention as hereinabove set forth may affect numerous modifications thereto. For example, a different air stream may be used, employing fluids other than air. Multiple nozzles may be employed, placed at different locations within the unloading apparatus to direct a fluid stream into the cassette. An external source of fluid may be used instead of an integral air compressor. These and other modifications are to be construed as lying within the contemplation of the instant invention as defined in the appended claims.

What is claimed is:

1. An x-ray cassette unloading apparatus, said cassette having adjacent plates contacting a film sheet therebetween and an exit slot, said apparatus having a housing defining a film sheet entrance slot and guide means adapted to position the cassette exit slot in alignment therewith, said apparatus including:
    means to separate said plates, and means to direct a fluid stream through said entrance and exit slots of sufficient momentum to loosen a film sheet from contact with the cassette plates, thereby permitting the film sheet to slide freely from the cassette into the entrance slot.

2. An apparatus as set forth in claim 1 wherein the fluid stream is a gas.

3. An apparatus as set forth in claim 2 wherein the fluid stream is air.

4. An apparatus as set forth in claim 3 wherein the film sheet defines a plane and the directing means includes a pair of jet streams symmetrically disposed on either side of said plane.

5. An apparatus as set forth in claim 1 wherein the film sheet defines a plane and the directing means includes a pair of jet streams symmetrically disposed on either side of said plane.

6. An apparatus as set forth in claim 3 wherein the film sheet defines a plane and the directing means includes a jet disposed in the plane of but outside of the slide path of the film sheet.

7. An apparatus as set forth in claim 1 wherein the film sheet defines a plane and the directing means includes a jet disposed in the plane of but outside of the slide path of the film sheet.

8. An apparatus as set forth in claim 1 wherein the film sheet defines a plane and the directing means includes a jet disposed on one side of said plane.

9. A method of unloading a film sheet from an x-ray cassette, the cassette having adjacent plates contacting a film sheet and defining a film sheet exit slot, comprising the steps of:
    separating the cassette plates, directing a fluid stream through the exit slot of sufficient momentum to loosen a film sheet from contact with the cassette plates, thereby permitting the film sheet to slide freely from the cassette.

10. A method as set forth in claim 9 which includes the step of supplying air for the fluid stream.

11. A method as set forth in claim 10 which includes the additional step of directing the fluid stream in the plane of the film sheet but outside of the slide path of the film.

12. A method as set forth in claim 10 which includes the additional step of directing a pair of jet streams symmetrically disposed on either side of the plane of the film.

* * * * *